Patented Apr. 25, 1939

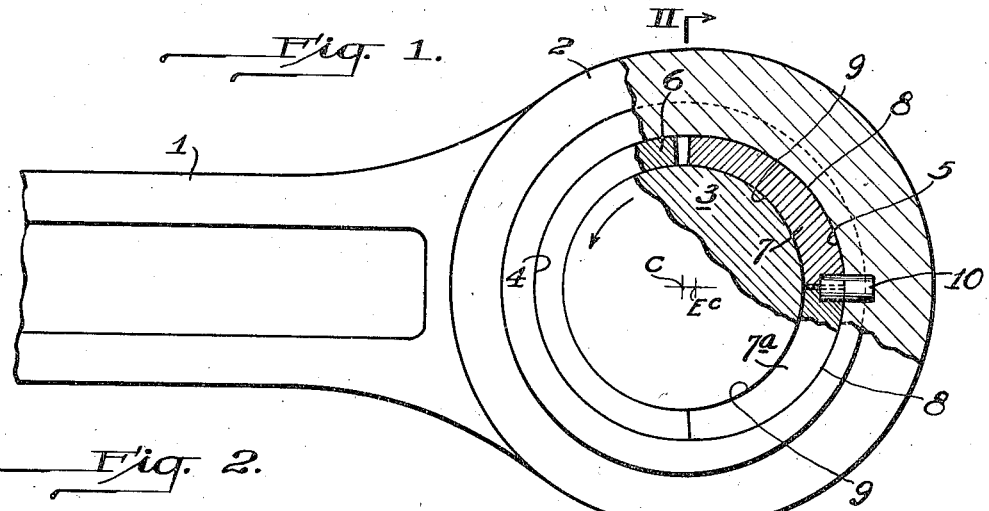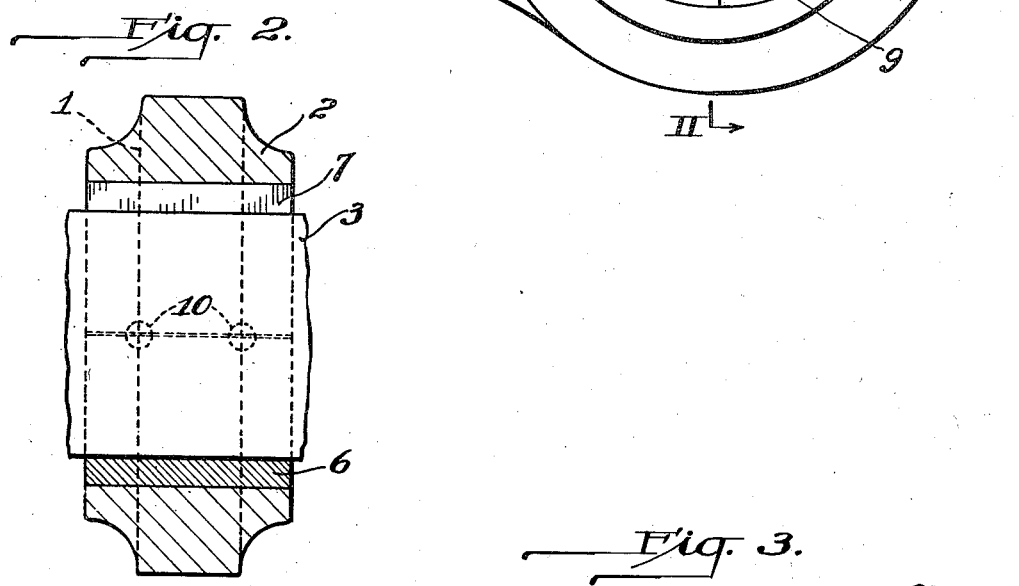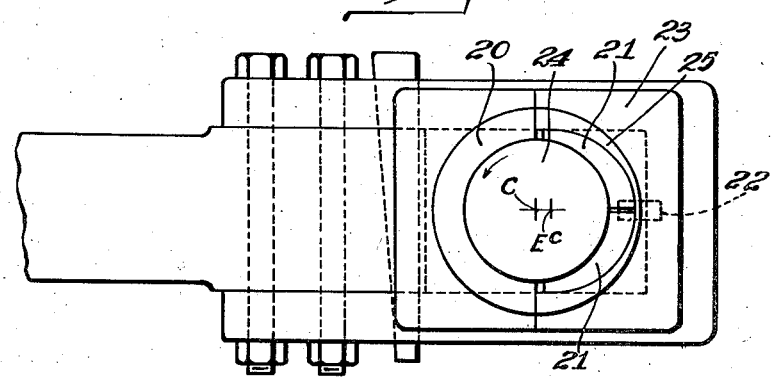

2,155,766

UNITED STATES PATENT OFFICE 2,155,766

CONSTANT-FIT BEARING

George Smith Morison, Pittsburgh, Pa., assignor, by mesne assignments, to Robert D. Christie, Pittsburgh, Pa.

Application May 19, 1937, Serial No. 143,476

12 Claims. (Cl. 308—67)

This invention relates to bearings for use with rotating members in which the play produced by the wearing away of the bearing surfaces is automatically taken up in the bearing.

The general object of this invention is to provide a bearing which automatically adjusts itself to maintain uniform bearing contact during the wearing down of the bearing faces.

Another object is to provide a bearing of the foregoing class which, although apparently worn out, can be prepared for further use by a simple operation.

Another object is to provide a bearing with a multiple-piece bushing which has a limited circumferential movement.

Other objects will become apparent when the following detailed description is read in conjunction with the accompanying drawing, in which Fig. 1 is an end elevation partly in section of a bearing embodying the preferred form of the invention after some wear has occurred; Fig. 2 a sectional view taken on line II—II of Fig. 1; and Fig. 3 an elevation of a modification of the invention in which one of the bushing segments is fixedly seated in the housing.

The bearing constructed according to this invention ordinarily comprises a bearing housing such as provided in a connecting rod or other movable member of that character having a transverse hole through it at its end for receiving a shaft, pin or the like. A plurality of bushing parts that are spaced from each other are positioned between the shaft and the bearing housing. In the preferred form of the invention a portion of the surface of the bearing housing is concentric and substantially all of the remainder eccentric with respect to the center of the shaft. The arcuate bushing parts seated on the eccentric face of the housing have outer surfaces that are eccentric to their inner surfaces. These eccentric, or wedge-shaped, bushings are oppositely inclined and are free to move circumferentially between the shaft and the bearing housing although means, such as stop-pins, are provided to limit this movement. The stop-pins are positioned in the housing between the thicker ends of the wedge-shaped bushings, which are adjacent. In the preferred embodiment of the invention, an arcuate semi-circular bushing of uniform radial thickness is received between the shaft and the concentric portion of the bearing housing for circumferential movement therebetween in addition to the aforesaid wedge-shaped bushings. Then, regardless of the direction of relative movement between shaft and housing, one of the wedge-shaped bushings bears on the stop-pins and the semi-circular bushing bears upon the end of this wedge-shaped bushing. At the same time the other wedge-shaped bushing segment is drawn away from the stop-pins and is wedged between the shaft and the bearing housing by the relative rotational movement. This wedging action automatically compensates for wear by urging the housing and the other bearing segments towards the shaft until a running bearing fit results. However, a limit is reached when this wedge-shaped bushing bears upon the semi-circular bushing. The bearing can be adapted to compensate for further wear by cutting an end section from any of the bushing segments.

A modification of the invention substitutes a bushing which is fixed in relation to the housing member in place of the semi-circular bushing of uniform radial thickness. The remainder of the bearing is the same as in the preferred form of the invention and functions as in that form of the invention.

Referring now to the drawing, a connecting rod 1 is shown which has an annular shaft-receiving opening or bearing housing 2 formed in its end in which a shaft, crank, or pin 3 is disposed. The bearing housing 2 is provided with a semi-circular bearing surface 4 having the same center (C) as the shaft 3 and with a portion 5 of the housing surface being spaced outward circumferentially from the surface 4 and eccentric with respect to the center of the portion 4. A multiple-part bushing is received between the bearing housing 2 and the shaft 3 and is free for circumferential movement therebetween. The multiple-part bushing includes an arcuate bushing 6 of uniform radial thickness which is normally in contact with the semi-circular bearing surface 4. Two arcuate wedge-shaped bushings 7 and 7a complete the multiple-part bearing and are in engagement with the eccentric portion 5 of the bearing housing. The outer surfaces 8 of the bushings 7 and 7a conform to the curvature of the eccentric portion 5 and have the point Ec, which is eccentric to the point C, as a center, while the radially inner surfaces 9 are formed on an arc swung about the point C and substantially complete the circle defined by the bearing surface of the arcuate bushing 6. The wedge-shaped bushings 7 and 7a initially abut each other and are spaced from the arcuate bushing 6.

Means are provided to limit the circumferential movement of the bushings and, in the form of the invention illustrated, comprise axially aligned stop-pins 10 which are embedded in and protrude from substantially the center of the eccentric portion 5 of the bearing housing. The wedge-shaped bushings 7 and 7a are positioned on each side of the stop-pins 10 with their thicker ends adjacent to and recessed to receive the stop-pins, as indicated in Fig. 1. Thus it will be seen that on relative rotation in either direction between the shaft 3 and the connecting rod 1 one of the wedge-shaped bushings will be forced against the stop-pins and held against circumferential movement. As the arcuate bushing 6 is free to move circumferentially the shaft 3 will carry it around until it bears upon the wedge-shaped bushing abutting the stop-pins. The relative rotation of the shaft 3 draws the remaining wedge-shaped bushing away from the stop-pins and pulls it between the bearing housing 2 and the shaft to produce a wedging action. This action results in the arcuate wedge forcing the bearing housing and the remaining bushing segments towards the shaft 3 and producing a running bearing fit even though considerable wear has occurred. Initially the bushings 6, 7 and 7a form a running bearing fit for the shaft 3 and this fit is maintained after wear occurs by the foregoing wedging action. As wear occurs the wedge-shaped bushing segment moves farther into the space provided, and so constantly takes up the wear and maintains a proper fit. If the direction of relative rotation, as indicated by the arrow, changes the functions of the wedge-shaped bushings are reversed.

The amount of wear that the multiple-part bushing will automatically compensate for is limited in that the wedge-shaped bushing 7, Fig. 1, with the relative rotation as indicated, will finally bear upon the end of the bushing 6. However, a particular feature of the invention is that the multiple-part bushing is constructed and arranged so that it can compensate for additional wear. This is done by cutting a section from either end of the arcuate bushing 6 or from the smaller end of one or both of the wedge-shaped bushings.

Although the invention has been illustrated and described with reference to a reciprocally driven connecting rod and a shaft, it will be understood that the end of the rod constitutes a bearing housing and that the invention is applicable to rotating shafts having fixed housings and to other similar structures where relative rotational movement occurs.

A modification of the invention is illustrated by Fig. 3 in which a housing 23 has a bearing aperture which surrounds and is spaced from a shaft 24, journaled therein. A bushing 20 having a semi-circular inner shaft-engaging surface is positioned within a portion of this space between housing 23 and shaft 24, and, within the remainder of the space, is placed a bushing 25 whose outer bearing surface snugly engages the bearing surface of housing member 23. The inner bearing surface of bushing 25 is eccentric to and spaced from shaft 24 in such manner that wedge-shaped bushings 21 are received between the shaft and said eccentric bearing surface. Two stop-pins 22 complete the bearing, as in the preferred form of the invention. Then one of the wedge-shaped bushings 21 will be drawn towards the bushing 20 and will exert a wedging action to maintain a running bearing fit after wear occurs, regardless of the direction of rotational movement. This bearing, too, is adapted to compensate for further wear after its apparent limit is reached by cutting sections from both facing ends of the bushing 20 and inserting shims or adjusting a wedge between the back of the bushing and the bearing, or by cutting a section from the smaller ends of the wedge-shaped bushings 21.

In order that the bushing parts may adjust themselves to compensate for considerable wear, sufficient space should initially be provided between the opposing faces of the bushing segments except where the thicker ends of the wedge-shaped bushings abut adjacent the stop-pins. Where the bearings are lubricated by the splash method this spacing is particularly desirable as it facilitates lubrication. As the wedging action by which the wear on the bushing is compensated for displaces the housing or shaft from its original position, the bearing is constructed to direct this displacement in the most desirable direction.

According to the provisions of the patent statutes, I have explained the principle and operation of my invention and have illustrated and described what I now consider to represent its best embodiment. However, I desire to have it understood that, within the scope of the appended claims, the invention may be practiced otherwise than as specifically illustrated and described.

I claim:

1. A bearing comprising in combination a shaft, a housing member, a plurality of arcuate bushings between the member and the shaft, all of the bushings being free for circumferential movement between the member and the shaft, and means integral with the member for limiting the circumferential movement of the bushings, at least one of the bushings having an associated arcuate wedging surface whereby relative rotation between the member and the shaft moves the bushing into wedged position between the member and the shaft to maintain a tight fit regardless of bearing wear.

2. A bearing comprising in combination a shaft, a housing member, a plurality of arcuate bushings between the member and the shaft, all of the bushings being free for circumferential movement between the member and the shaft, means integral with the member for limiting the circumferential movement of the bushings, and means associated with at least two of the bushings whereby relative movement in either direction between the member and the shaft moves one of the bushings into wedged position between the member and the shaft to compensate for bearing wear and maintain all bearing surfaces in a tight bearing fit.

3. A bearing comprising in combination a shaft, a housing member, a plurality of arcuate bushings between the member and the shaft, all of the bushings being free for circumferential movement between the member and the shaft, and means integral with the member for limiting the circumferential movement of the bushings, at least two of the bushings having oppositely inclined associated arcuate wedging surfaces whereby relative movement in either direction between the member and the shaft moves one of the bushings into wedged position between the member and the shaft to maintain a tight fit between the shaft and all of the bearing surfaces.

4. In combination, a relatively movable shaft, a surrounding housing, a bushing having concentric inner and outer surfaces seated in a portion of the housing, a portion of the remainder of the inner face of the housing being eccentric with respect to the center of said shaft, two oppositely inclined arcuate wedge-shaped bushings positioned on portions of the eccentric surface of the housing and engaging with the shaft, and means positioned between the ends of the wedge-shaped bushings to limit their movement towards each other, there being clearance circumferentially between the wedge-shaped bushings and the first-named bushing so that upon rotation of the shaft one of the wedge-shaped bushings will be drawn between the shaft and the housing to maintain a tight fit between the shaft and bearing surfaces.

5. In combination, a relatively movable shaft and surrounding housing, a bushing having concentric inner and outer bearing surfaces seated on a portion of the bearing surface of the housing concentric with the shaft, a portion of the remainder of the inner face of the housing being spaced circumferentially from and eccentric with respect to the former surface, an arcuate wedge-shaped bushing positioned on a portion of the eccentric surface of the housing and engaged with the shaft, a second oppositely extending arcuate wedge-shaped bushing positioned on another portion of the eccentric surface of the housing and engaged with the shaft, and means secured to the housing and positioned between the ends of the wedge-shaped bushings to limit their movement towards each other, there being clearance circumferentially between the wedge-shaped bushings and the semi-circular bushing so that upon relative rotation between the shaft and housing one of the wedge-shaped bushings will be wedged by the rotation to maintain a tight fit between the shaft and the bearing surfaces.

6. A bearing comprising in combination, a shaft, a housing member, a multiple-piece bushing received in the housing member and engaged with the shaft, at least two of the bushing segments being oppositely inclined arcuate wedges and being seated on a portion of the inner surface of the housing member eccentric to the shaft, the multiple-piece bushing being free for circumferential movement between the shaft and the member, and means integral with the member and positioned between the arcuate wedges for limiting the circumferential movement of the bushing, the bushing automatically adjusting itself to maintain a tight bearing surface as wear occurs by one arcuate wedge being drawn toward the remaining portions of the bushing by relative movement between the shaft and the housing member until limited by bearing thereon, the bushing being constructed and arranged so that an end portion can be removed to permit further travel for compensation for additional wear.

7. A shaft bearing comprising a housing member whose bearing surface surrounds and is spaced from said shaft, one semi-circular portion of said bearing surface being concentric with said shaft and the remainder of said surface falling in a cylindrical plane further spaced from said shaft upon an axis eccentric to the axis of said shaft, two arcuate wedge-like bushings engaging said shaft and said eccentric bearing surface, the bases of said wedge-like bushings being opposed, means integral with said housing member for limiting the circumferential movement of said wedge-like bearing bushings toward one another, and a semi-circular annular bushing engaging said shaft and said concentric bearing surface of said housing and being free to move circumferentially, whereby upon rotation of said shaft said annular bushing is forced against one wedge-like bushing to form a bearing surface continuous throughout the extent of the two bushings.

8. A shaft bearing comprising a housing member whose bearing surface surrounds and is spaced from said shaft, one portion of said bearing surface being concentric with said shaft and the remainder of said bearing surface falling in a cylindrical plane further spaced from said shaft upon an axis eccentric to the axis of said shaft, two arcuate wedge-like bushings engaging said shaft and said eccentric bearing surface, the bases of said wedge-like bushings being opposed, means integral with said housing member for limiting the circumferential movement of said wedge-like bearing bushings toward one another, and an annular bushing engaging said shaft and said concentric bearing surface of said housing and being free to move circumferentially, whereby upon rotation of said shaft said annular bushing is forced against one wedge-like bushing to form a bearing surface continuous throughout the extent of the two bushings.

9. A shaft bearing comprising a housing member whose bearing surface surrounds and is spaced from said shaft, a bushing having a semi-circular inner bearing surface engaging the bearing surfaces of said shaft and housing, a second bushing engaging the remainder of said housing bearing surface and having its inner bearing surface spaced from and eccentric to said shaft, two arcuate wedge-shaped bushings fitted snugly between said shaft and said eccentric portion of said bushing and having their bases opposed, and means integral with said shaft housing member for limiting the circumferential movement of said wedge-shaped bushings, whereby upon relative rotation of said shaft and housing member one wedge-shaped bushing abuts against the motion-limiting means and the other is frictionally forced between said shaft and said eccentric surface of said bushing to produce firm engagement between said shaft and all the bushings.

10. A shaft bearing comprising a housing member whose bearing surface surrounds and is spaced from said shaft, an annular bushing engaging the bearing surfaces of said shaft and housing, a second annular bushing engaging the remainder of said housing bearing surface and having its inner bearing surface spaced from and eccentric to said shaft bearing surface, two arcuate wedge-shaped bushings fitted snugly between said shaft and said eccentric portion of said bushing and having their bases opposed, and means integral with said shaft housing member for limiting the circumferential movement of said wedge-shaped bushings, whereby upon relative rotation of said shaft and housing member one wedge-shaped bushing abuts against the motion-limiting means and the other is frictionally forced between said shaft and said eccentric surface of said bushing to produce firm engagement between said shaft and all the bushings.

11. A shaft bearing comprising a housing member whose bearing surface surrounds said shaft and is spaced from it, an annular bushing engaging a portion of said housing bearing surface and having its inner bearing surface spaced from and eccentric to said shaft bearing surface, two arcuate wedge-shaped bushings fitting snugly between said shaft and said eccentric portion of said bushing and having their bases opposed, means integral with said shaft housing member for limiting the circumferential movement of said wedge-shaped bushing, and a second annular bushing having inner and outer bearing surfaces engaging said shaft and said housing bearing surface, whereby said annular bushing is free to move circumferentially.

12. A shaft bearing comprising a housing member whose bearing surface surrounds said shaft and is spaced from it, a bushing engaging the bearing surfaces of said shaft and said housing, a second bushing engaging said housing member and having its inner bearing surface spaced from and eccentric to said shaft bearing surface, two arcuate wedge-shaped bushings fitted snugly between said shaft and said eccentric portion of said bushing and having their bases opposed, and means integral with said shaft housing member for limiting the circumferential movement of said wedge-shaped bushings, whereby upon relative rotation of said shaft and housing member one wedge-shaped bushing abuts against the motion-limiting means and the other is frictionally forced between said shaft and said eccentric surface of said bushing to produce firm engagement between said shaft and all the bushings.

GEORGE SMITH MORISON.